(12) United States Patent
Müller

(10) Patent No.: US 6,257,814 B1
(45) Date of Patent: Jul. 10, 2001

(54) SELF-ATTACHING FASTENER, METHOD OF FORMING SAME AND METHOD OF ATTACHMENT

(75) Inventor: Rudolf R. M. Müller, Frankfurt (DE)

(73) Assignee: Profil Verbindungstechnik & Co. (DE)

( * ) Notice: Subject to any disclaimer, the term of this patent is extended or adjusted under 35 U.S.C. 154(b) by 0 days.

(21) Appl. No.: 09/149,626

(22) Filed: Sep. 8, 1998

Related U.S. Application Data (63) Continuation of application No. 08/773,526, filed on Dec. 23, 1996, which is a continuation-in-part of application No. 08/698,870, filed on Aug. 16, 1996, now Pat. No. 5,782,594.

(30) Foreign Application Priority Data

Aug. 18, 1995 (DE) .............................................. 195 30 466

(51) Int. Cl.[7] ...................................................... F16B 39/00
(52) U.S. Cl. ......................... 411/176; 411/179; 411/180; 411/181
(58) Field of Search ..................................... 411/179, 180, 411/181, 176; 29/432, 432.1, 525, 525.01

(56) References Cited

U.S. PATENT DOCUMENTS

| | | | |
|---|---|---|---|
| 3,253,631 | * 5/1966 | Reusser | 411/179 |
| 3,282,315 | 11/1966 | Zahodiakin . | |
| 3,282,317 | 11/1966 | Zahodiakin | 411/176 |
| 3,299,500 | 1/1967 | Double . | |
| 3,724,520 | 4/1973 | Ladouceur et al. . | |
| 3,810,291 | 5/1974 | Ladouceur . | |
| 3,926,236 | 12/1975 | Pouch et al. . | |
| 4,708,556 | 11/1987 | Pamer et al. . | |
| 5,531,552 | * 7/1996 | Takahashi et al. | 411/180 |
| 5,549,430 | 8/1996 | Takahashi et al. . | |
| 5,782,594 | 7/1998 | Muller . | |

FOREIGN PATENT DOCUMENTS

| | | |
|---|---|---|
| 2227039 | 12/1972 | (DE) . |
| 2229499 | 7/1976 | (DE) . |
| 3019070A1 | 5/1980 | (DE) . |
| 3314487A1 | 4/1983 | (DE) . |
| 2441977 | 4/1985 | (DE) . |
| 3524306A1 | 7/1985 | (DE) . |

* cited by examiner

Primary Examiner—Lynne H. Browne
Assistant Examiner—Fredrick Conley
(74) Attorney, Agent, or Firm—Howard & Howard (57) ABSTRACT

A fastener, for example a nut element, for attachment to a plate-like component with an end face of the fastener having a recess within a raised contact surface and a plurality of projections and undercuts are provided in a sidewall of the recess. The base surface of the recess extends up to the bore of the fastener without the presence of a pilot portion and a plurality of recesses are provided in the contact surface for resisting rotation. The die button which serves for the attachment of the fastener to a plate-like component has a hole-forming punch projection which has a plurality of noses distributed around the periphery in the region of the transition to the planar surface of the die button. On attachment of the hollow element to a plate-like component in a press, the sheet metal part is perforated by a hole punch and is molded in form-locked manner by the die button, in particular by its hole-forming punch projection, into the recess of the hollow element. The connection as generated is particularly suitable for sheet metal parts which are subjected to changing loads in operation, and has a high resistance to twist-out and push-out.

5 Claims, 10 Drawing Sheets

SELF-ATTACHING FASTENER, METHOD OF FORMING SAME AND METHOD OF ATTACHMENT

This is a continuation of co-pending application which U.S. Ser. No. 08/773,526 filed on Dec. 23, 1996,is a continuation-in-part application of U.S. Pat. application Ser. No. 08/698,870 filed Aug. 16, 1996 now U.S. Pat. No. 5,782,594 which claims priority to German Patent Application No. 19530466.7 filed on Aug. 18, 1995.

BACKGROUND

The present invention relates to self-attaching fasteners, a die button for use with such fasteners, a method of attaching such fasteners to a plate-like component, and the assembly which results after carrying out the method and the method of forming the improved self-attaching fasteners.

Fasteners of the general type having a hollow body or bore, such as for example internally threaded nuts are known from EP-A-0 553 822 A1 or from the corresponding US-A-5 340 251. Similar elements having hollow bodies are moreover known from US-A-3 234 987, from US-A-3 648 747 or from US-A-3 253 631.

All these known embodiments have a so-called pilot portion. That is to say that the groove or recess at the end face projecting toward the panel or part is restricted at the radially inner side by a projecting cylindrical pilot portion which extends at least substantially up to the end face.

Such fasteners are typically nut elements; however, for example they could have a cylindrical bore for receiving a spigot or the like. These fasteners offer relatively high security against rotation so that on screwing in a bolt element the fasteners remain firmly anchored to the component, and moreover have a relatively high resistance to push-out.

It has however been found that in operation with changing loads the fasteners sometimes tear out of the plate-like component which is normally made of sheet metal. Moreover the manufacture of such elements or fasteners having hollow bodies is relatively costly and a problem exists that the contact surface is frequently not adequate. Furthermore. the radial dimensions of the part engaging surface of the fastener make it necessary to use a relatively large washer at the bolt side in order to transmit the forces in the desired manner.

The undercut in the sidewall of the fastener recess which is necessary to generate the required press-out resistance of the hollow body, is normally generated in such a way that the hollow element is subjected to a squeezing process at the outer peripheral jacket with the sidewall of the recess being brought from an initially axial parallel position into an inclined position. This results in the opening to the recess between the pilot part and the now inclined sidewall to be smaller in comparison to the base surface of the recess. Additionally, as a result of this squeezing movement, the hollow element also has an inclined surface at the outer jacket surface adjacent to the end face engaging the component. On attachment to the plate-like component, the wedge-shaped contact surface, facing the plate-like component, is frequently so deformed that it acts in a knife-like manner under load and a high surface pressure results between the component and the hollow element.

As a result of this high surface pressure the plate-like component yields after a few operating hours and no longer sits as tightly as designed, so that the danger of settlement and of reduction of the preload to zero exists, and thus the danger of failure of the threaded connection.

SUMMARY OF THE INVENTION

The present invention is based on the object of providing a fastener which can be manufactured economically and ensures good security against twist-out, a reliable seat after attachment to the plate-like component, and retains a firm seat even with changing loads without being torn out of the plate-like component and without loosening the bolt element that is used. Another advantage is that the contact surface can be smaller in diameter in comparison to prior solutions but nevertheless of adequate size area-wise so that an undesired high surface pressure does not arise at the plate-like component.

In order to satisfy this object, provision is made in accordance with the invention for the base surface of the fastener recess to extend up to the passage of the bore at least substantially preferably without a pilot portion.

The pilot portion which played a central role with the previously mentioned nut elements during the deformation of the plate-like component into the recess may be omitted in the disclosed embodiment of this invention. In this way, the radial dimensions of the nut element can be reduced approximately by the wall thickness dimensions of the customary pilot portion, whereby the inner diameter of the contact surface is made substantially smaller in diameter. This however also offers the possibility of dimensioning the outer diameter of the contact surface in comparison to the inner diameter in such a way that the radial width of the contact surface is larger. In this way an enlarged ring surface is present in comparison to the known hollow elements and the surface pressure can be reduced in operation. As a result of the changed dimensions the necessity of using a washer at the bolt side can be avoided.

In order to use this element with a hollow body, a modification of the die button and of the setting head is necessary to satisfy the functions previously satisfied by the pilot portion. In the prior art, the pilot portion serves on the one hand as a hole punch in order to punch out a slug from the sheet metal part in cooperation with a die button. This punching function is now achieved by means of a hole punch which is coaxially guided in the setting head relative to the hollow element and which, during the closing movement of the setting head, moves through the bore of the hollow element and in cooperation with the die button, serves to punch out a slug.

A hole punch of this kind is known, for example from the German patent 34 46 978 or from DE-OS 38 35 566.3; however, the hole punch is used there with a differently shaped hollow element which, so to say, also has a pilot portion in the form of a so-called rivetting section. Accordingly the use of a hole punch with a nut element without a pilot portion is not believed to be obvious.

Another function of the pilot portion in the hollow element of the prior art lies in forming the metal of the sheet metal component into the undercut in order to generate the security against push-out and additionally also the security against twist-out. This function is also taken on by the die button of the present invention and solved differently than before.

To generate the security against twist-out for the hollow element of the present invention, a number of end face recesses are pressed into the contact surface. The die button for the insertion of the nut element has a plurality of noses which ensure that the material of the plate-like component is pressed onto at least one of the end face recesses and preferably into a plurality of the recesses and generates a resistance against rotation. By way of example, eight recesses can be provided in the contact surfaces and six noses on the die button whereby, independently of the respective rotational position of the fastener, at least one of the noses lies opposite a recess.

Through the use of a recess in the contact surface, undercuts are formed at the sidewall of the recess in the hollow element simultaneously with the forming of the recesses by pressing and indeed in the form of local bead-like deformations or rib portions of the sidewall or outer wall of the fastener recess. During the attachment process the sheet metal is pressed into the so formed undercuts which additionally ensures the required resistance to push-out and on the other hand however also forms an additional resistance against rotation.

Since the undercuts arise during the formation of the recess in the contact surface of the hollow element, and do not have to be generated by a squeezing movement at the jacket surface of the hollow element, the hollow element lacks the pronounced chamfer which arises with hollow elements in accordance with the initially named EP-A-0 553 822. This is however of advantage because it is then possible to form the transition from the contact surface into the jacket surface of the hollow element with only a small radius, for example of less than 0.5 mm, whereby the available surface of the contact surface is increased in comparison to the prior art.

In a second preferred embodiment of the self-attaching female fastener element of this invention, the end or contact face includes a continuous sinuate recess which extends arcuately toward and away from the sidewall or outer wall of the fastener recess. The outer wall or the fastener recess is also sinuate in shape, conforming to the sinuate shape of the continuous recess and forming the bead-like deformations or rib portions. As described, the rib portions overly the bottom wall of the fastener recess restricting the opening of the fastener recess and providing resistance to turning of the fastener when attached to a sheet metal part. In this preferred embodiment, the spaced bead-like deformations or rib portions are each inclined outwardly from the fastener recess outer wall, overlying the bottom wall.

The method of making a self-attaching female fastener element of this invention includes forming a nut blank having a central axis, a projecting flange portion on at least opposed sides of the central axis having a generally planar end face or contact surface and a fastener recess having a bottom wall and an outer wall defined by the flange portion extending generally perpendicular to the fastener recess bottom wall. In a conventional cold forming operation, the fastener bore will be partially formed in the nut blank. One preferred embodiment of the method of this invention then includes deforming the flange portion end face with a die member having an end face including a plurality of spaced projections separated by die recesses. The method includes driving the projections of the die member end face into the flange portion end face forming an end face recess in the flange portion end face and generally simultaneously deforming the fastener recess outer wall inwardly toward the central axis forming a plurality of spaced projecting bead-like deformations or rib portions as described above. The die recesses limit the penetration of the die member projections. When the bottom surface of the die recesses contact the end face of the flange portion, the force required for further deformation significantly increases and the press ram setting can then be set to stop further deformation. This assures very accurate formation of the bead-like projections or rib portions and accurately defines the diameter of the opening to the fastener recess.

In one preferred embodiment, the die member end face is inclined toward a central axis and the die member end face includes a plurality of spaced radially extending die recesses preferably having an arcuate bottom wall. The method then includes driving the die member projections into the flange portions end face until the arcuate bottom wall surface of the die recesses contact the flange portion end face. In another preferred embodiment of this invention, the die member end face includes a sinuate projecting die portion which forms the sinuate recess in the contact surface or end face of the flange portion of the nut blank. The method then includes driving the sinuate-shaped projection of the die member into the flange portion end face, forming a sinuate recess or groove in the end face of the flange portion and simultaneously deforming the sidewall or outer wall of the fastener recess radially inwardly forming the bead-like projections or rib portions described above. In this embodiment, the end face of the bead-like projections are generally co-planar with the end face of the flange portion and inclined from a mid portion of the outer wall of the fastener recess.

The method of this invention may also be used to form a restricted opening in other types of self-attaching fasteners including fasteners having a central pilot portion, wherein the fastener recess may be an annular groove surrounding the pilot portion or parallel grooves of a pierce nut. This method eliminates the requirement of forming re-entrant grooves or grooves having a dove-tailed configuration in a rolling operation. Other advantages and meritorious features of the present invention will be more fully understood from the appended drawings, claims and the description of the preferred embodiments below.

DESCRIPTION OF THE DRAWINGS

The invention will be explained in more detail in the following with reference to embodiments having regard to the drawings in which are shown.

DESCRIPTION OF THE PREFERRED EMBODIMENTS OF THIS INVENTION

Figure 1:
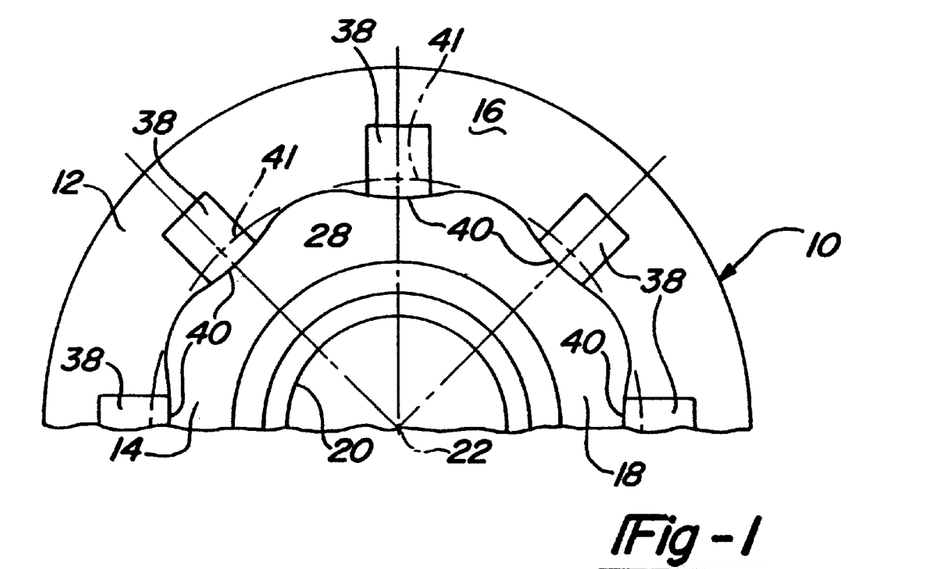
FIG. 1 is a plan view on the end face of an element having a hollow body in accordance with the invention, with only one half of the hollow element being shown.
Figure 2:
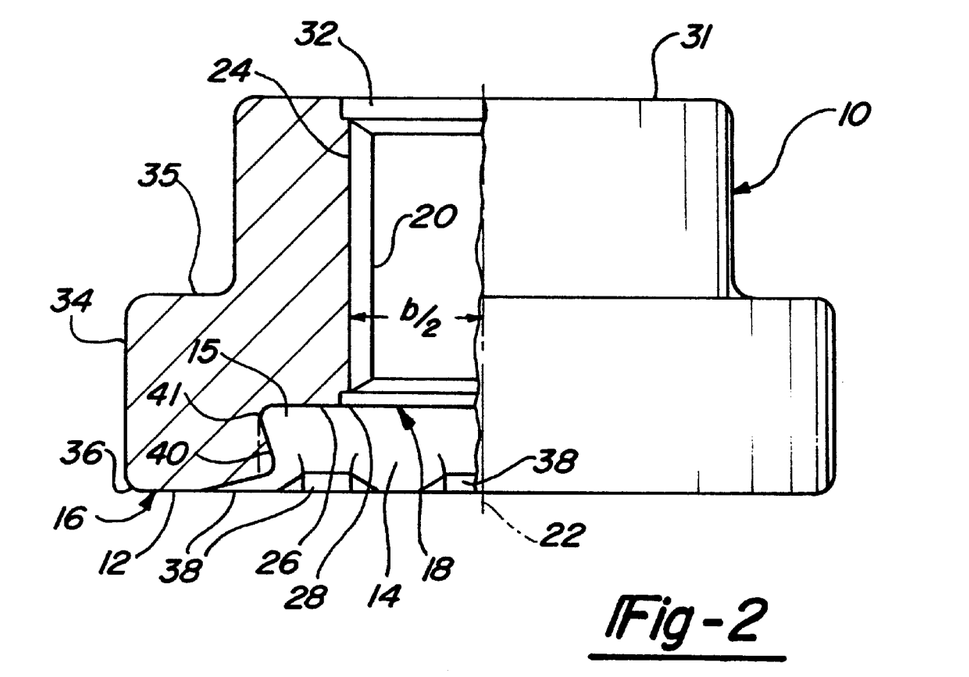
FIG. 2 is a partly sectioned side view of the hollow element of the invention in accordance with FIG. 1.

As seen in FIGS. 1 and 2, the disclosed embodiment of the self-attaching hollow element or fastener 10 consists of an essentially cylindrical body of metal having a projecting annular flange portion with an end face 12 which, after attachment of the element to a plate-like component, faces the plate-like component. The end face 12 has a fastener recess 14 which is arranged within a raised or projecting contact surface 16, with the base surface or bottom wall 18 of the fastener recess extending up to the bore 20 of the hollow element 10. The bore 20 has a central axis 22 which at the same time represents the longitudinal axis of the hollow element and is formed as a threaded bore with a thread 24, so that the hollow element shown is a nut element.

The base surface 18 of the fastener recess 14 merges via a shoulder 26 into a surface 28, with the outer diameter of the surface 28 being fractionally larger than the outer diameter D of the thread 24 provided in the bore 20. One notes that the bore 20 or the thread 24, the surface 28, the shoulder 26 and the recess 14 as well as the contact surface 12 lie coaxial to the central axis 22 of the hollow element 10. The further end face 31 of the hollow element is in this embodiment is made flat and simply provided with a small countersink 32 which forms a clean transition to the thread 24.

The stepped jacket surface 34 of the flange portion of the hollow element merges via a small radius 36 into the end face 12 and this radius 36 is preferably made smaller than 0.5 mm, for example 0.3 mm.

In the disclosed embodiment, the contact surface 16 has eight end face recesses 38 which, as can be seen from FIG. 2, are made substantially wedge-shaped and have their greatest depth at the transition into the sidewall or outer wall 15 of the fastener recess 14. In plan view the recesses 38 are approximately rectangular as can be seen from FIG. 1. These recesses are generated by cold forming during the manufacture of the nut element as described below and the corresponding deformation of the hollow element blank leads to bead-like projections or projecting portions 40 in the outer wall of the fastener recess 14, with these projections leading, as can clearly be seen from the left side of FIG. 2, to local undercuts 41 in the sidewall of the fastener recess 14.

As materials for the self-attaching or riveting elements, all materials can be used which in the context of cold forming achieve the strength values of class 8 in accordance with the ISO-standard, for example a 35 B2-alloy in accordance with DIN 1654. The so formed hollow elements or nut elements are suitable, amongst other things, for all commercially available steel materials for drawn quality sheet metal parts and also for aluminum or magnesium or their alloys. The nuts can also be formed in other materials, for example in aluminum alloy, in particular in an aluminum alloy of higher strength.

It will be understood that in FIG. 2, the formation of the nut element at the right hand side of the central axis 22 is identical to that on the left hand side.

The manner of attachment of the self-attaching element of FIGS. 1 and 2 in a plate-like component in the form of a sheet metal part 42 will be subsequently explained in more detail with reference to FIGS. 3 to 8.

Figure 3:
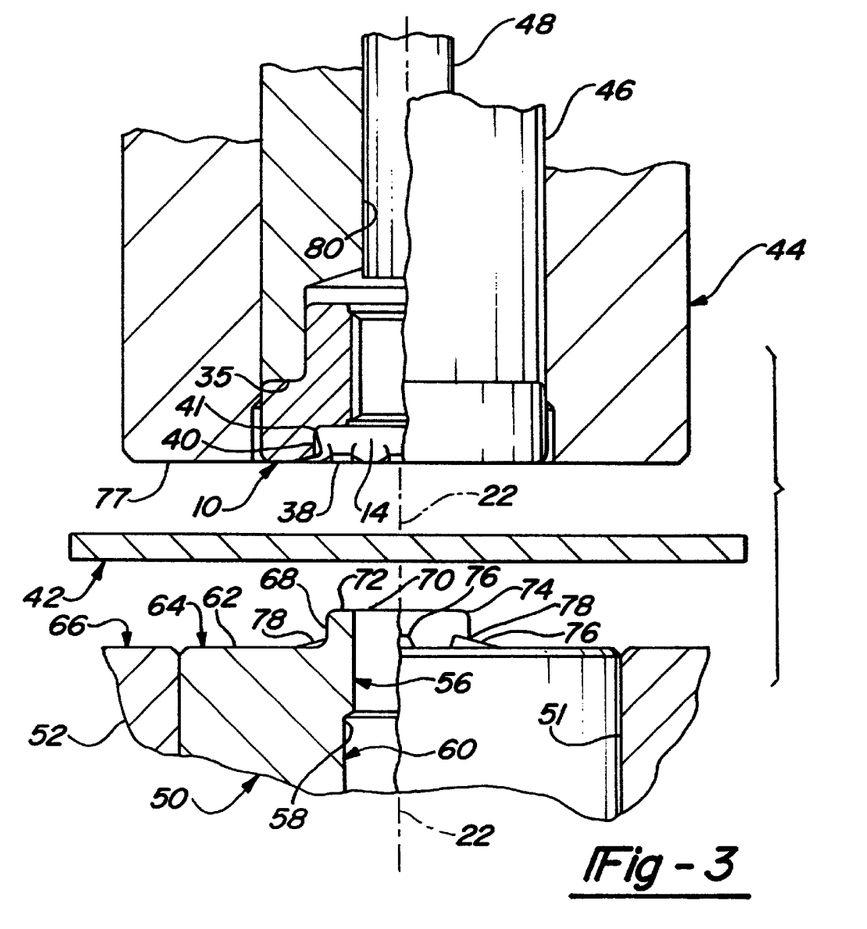
FIG. 3 is a schematic illustration of the first phase of a method of the invention for attachment of the hollow element of FIGS. 1 and 2 to a plate-like component.
Figure 3A:
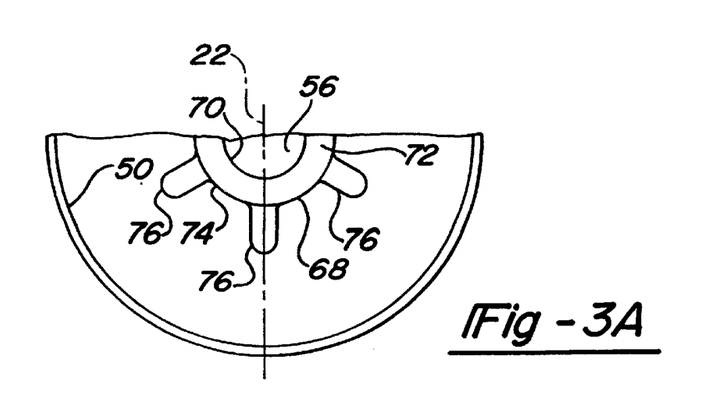

In FIG. 3 the hollow element 10 of the invention is shown in an only partly illustrated setting head 44 which has a plunger 46 and also a hole punch 48 arranged coixially to the plunger 46. A setting head of this kind is known per se in principle from the above-mentioned German specifications, i.e. DE-PS 34 46 978 and DE-OS 38 35 556.3.

Figure 7:
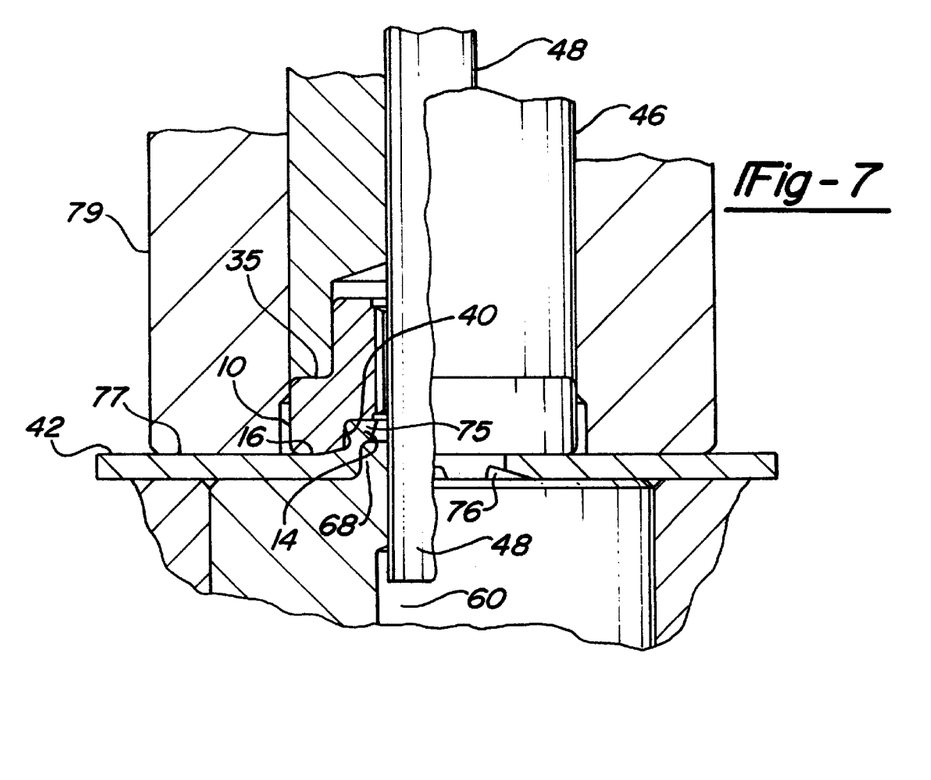
FIGS. 7, and 7A are the end of the method of the invention after the attachment of the hollow element to the plate-like component, with FIG. 7A showing the arrangement of the die button in the lower tool.
Figure 7A:
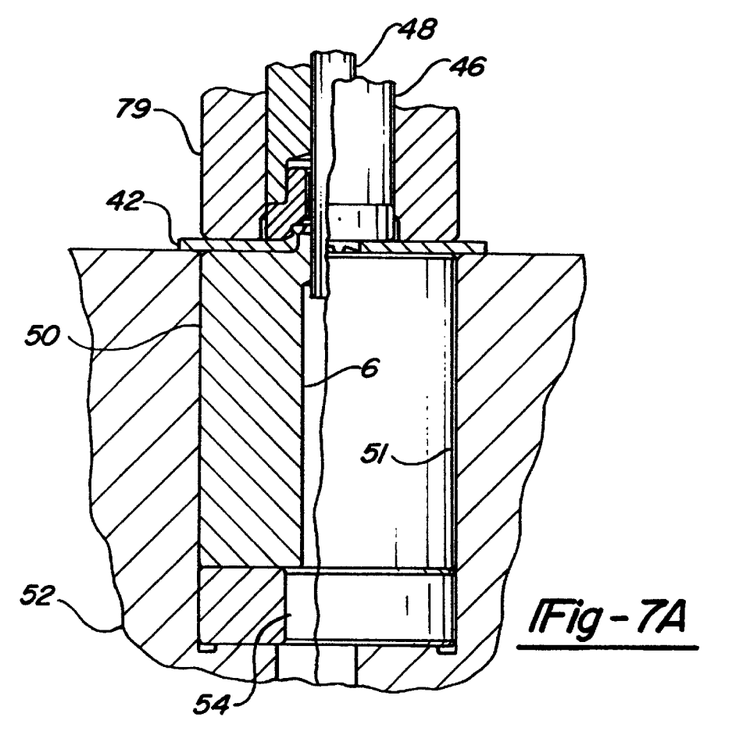

Beneath the sheet metal part 42 there is located a die button 50 which, as is for example illustrated in FIG. 7A, is inserted as a cylindrical component into a cylindrical bore 51 of a lower tool 52 of a press and is held at the correct height, flush with the surface of the lower tool 52 by means of a spacer 54. The die button 50 has a central bore 56 which merges via a ring shoulder 58 into a larger bore 60. The end face 62 of the die button 50 has a planar surface 64 which lies flush with the upper surface 66 of the lower tool 52. Furthermore the end face of the die button 50 has a hole-forming punch projection 68. The bore 56 which forms the aperture of the punch projection 68 has a cutting, edge 70 with an inner diameter which corresponds to that of the bore of the hollow element. The end face 72 arranged coaxial to the longitudinal axis 22 and which stands at least substantially perpendicular to this axis has a rounded drawing edge 74 at the transition to the jacket surface of the hole-forming punch projection 68.

A plurality of noses 76 are arranged at intervals around the punch projection. In this example six such noses are provided which are uniformly arranged around the hole-forming punch projection 68. The noses 76 have an inclined surface 78 and are formed in raised manner both at the jacket surface of the hole-forming punch projection 68 and also at the planar end face 64 of the die button 50.

The noses 76, which are as a whole rounded at all surfaces are made somewhat narrower than the recesses 38 in the contact surface 16 of the nut element 10. Through the use of the same reference numeral 22 it is made clear that the hole punch 48, the plunger 46, the lower end face 77 of the setting head, the hollow element 10 and the die button 50 of the lower tool 52 and also the bore 56 and the bore 60 of the die button and ultimately also the through-bore of the spacer 54 are all coaxially arranged.

The setting head 44 itself is arranged in known manner at the upper tool of a press and is so designed, in the usual manner, that the respective nut elements 10 pass through an inclined channel into the bore 80 of the setting head 44 and are subsequently guided by means of the plunger 46 during closing of the press to the end face of the setting head.

Figure 4:
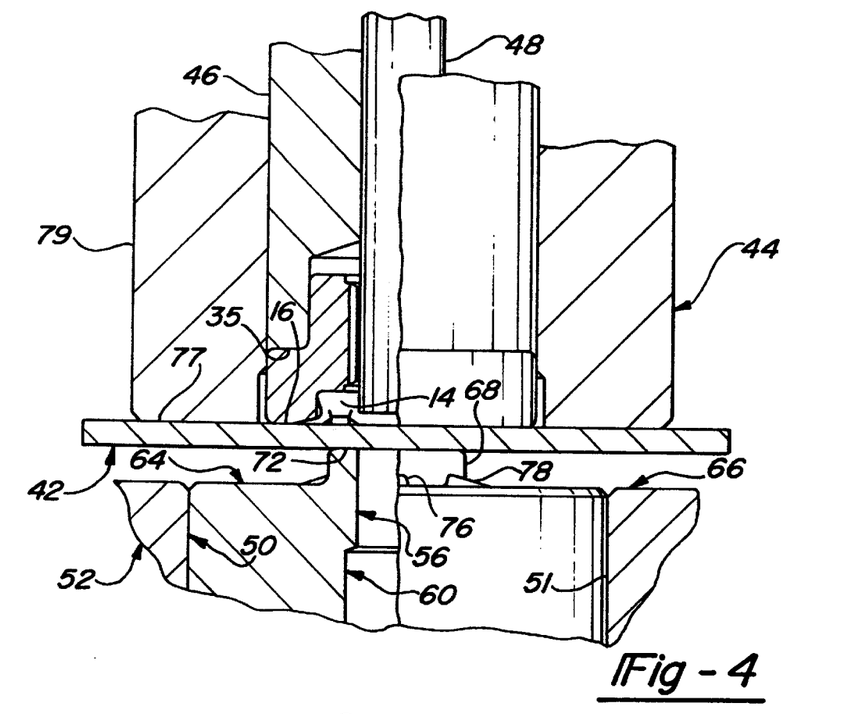
FIG. 4 is a later phase of the method of the invention shortly before the perforation of the plate-like component.
Figure 5:
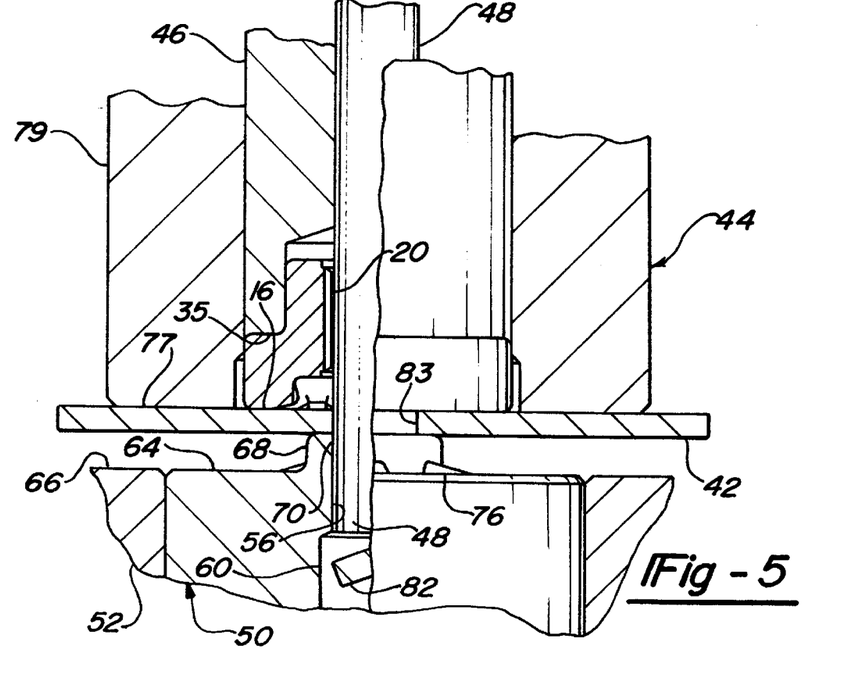
FIG. 5 is a later phase of the method of the invention immediately after the perforation of the plate-like component.

On closing of the press, for example for the shaping of the sheet metal part by the lower tool 52 in combination with an upper non-illustrated tool, the setting head moves from the position of FIG. 3 to the position of FIG. 4. The lower end face 77 of the setting head 44 comes into contact with the sheet metal part 42 in this way and the sheet metal part is in turn pressed against the end face 72 of the die button 50. A further downward movement of the housing 79 of the setting head is prevented at this stage, the housing 79 of the setting head deflects rearwardly somewhat relative to the downwardly moving tool of the press. This also applies to the plunger 46 which advantageously presses against the shoulder 35 of the hollow element and not against the end face 31, whereby the danger of damaging the thread 34 is effectively avoided. The upper tool of the press however drives the hole punch 48 further downwardly initially into the position of FIG. 5. During this movement, the hole punch 48 cuts a slug 82 out of the sheet metal part 42 in cooperation with the cutting edge 70 of the hole-forming punch projection 68 of the die button 50, as shown in the sequential drawing of FIG. 5. In this manner a punched hole 83 is formed in the sheet metal part 42. One can see from this drawing that the hole punch 48 is slidingly received in the bore 56 of the die button 50 as well as in the bore 20 of the hollow element 10.

The slug 82 can be removed through the bore 60 of the die button 50 and the larger diameter of this bore 60 in comparison to the bore 56 ensures that the slug moves easily under gravity and does not become caught or stuck.

Figure 6:
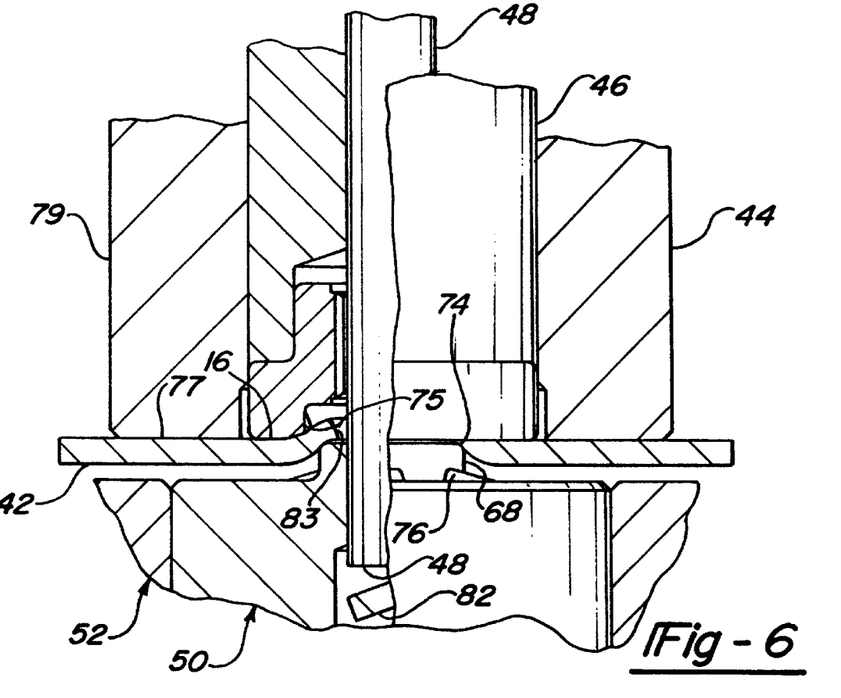
FIG. 6 is a still later phase of the method of the invention during the deformation of the plate-like component.

During the further closing movement of the press, the housing 79 of the setting head 44 and the plunger 46 are jointly moved further downwardly, as shown in FIG. 6, whereby the hole-forming punch projection 68 or, stated more precisely, the rounded drawing edge 74 of the hole-forming punch projection forms a collar 75 from the sheet metal material around the punched hole 83 while widening out the punched hole. This deformation continues up to the end stage as shown in FIG. 7 and one can see from FIG. 7 that the hole-forming punch projection 68 has so deformed the sheet metal material, or the collar 75, that this has been pressed in form-locked manner into the fastener recess 14 of the hollow element and into the undercuts 40.

As a result of the different number of noses 76 in comparison to the number of end face recesses 38 in the contact surface or end face 16 of the hollow element, it is ensured that at least one nose comes fully into alignment with an end face recess 38, and indeed without having to take any measures to secure the rotational position of the hollow element about the central axis 22. At least partial alignment with the noses of the die button can be expected for at least some of the other end face recesses 38, so that a form-locked contact also arises there, whereby the security against rotation is ensured.

Since the bead-like projections 40 which form the undercuts likewise lead to a corrugated surface of the sidewall of the fastener recess 14 the form-fitted contact of the sheet metal part against this sidewall likewise provides a significant contribution to the rotational security of the connection.

Figure 8:
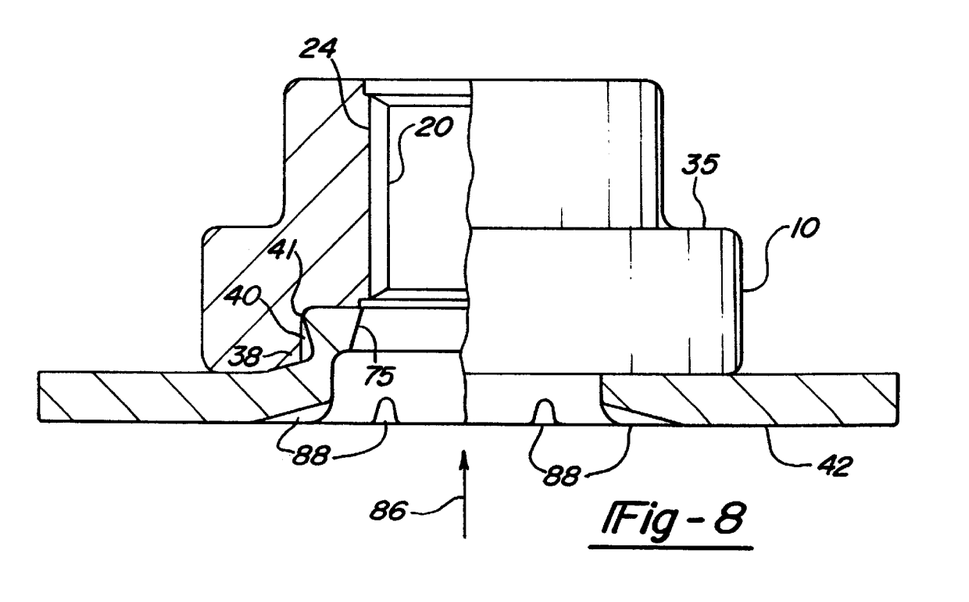
FIG. 8 is a partly sectioned side view of the assembly consisting of the hollow element of the invention and a sheet metal part.

In the step illustrated in FIG. 7, the press opens again and the workpiece 42 together with the attached hollow element is ejected from the press or removed from the press and then presents itself as shown in FIG. 8. One can see from FIG. 8, that the inner diameter of the collar 75 of the sheet metal part 42 is somewhat larger than the outer diameter of the thread 24, so that the sheet metal part cannot prevent the insertion of a bolt. The bolt which its into the thread 24 is normally introduced in the direction of the arrow 86 and customarily serves to secure a second sheet metal part to the sheet metal part 42. It can be seen clearly from FIG. 8 that a considerable contact surface is present so that the surface pressure can be readily kept within permissible limits dependent on the material, and indeed also with a hollow element of a comparatively small diameter. The recesses 88 which are generated by the noses 76 in the sheet metal part are also evident in FIG. 8.

Although the hollow elements shown here all have a circularly cylindrical jacket surface, i.e. a circular cross-section in plane view, other cross-sectional shapes, for example polygonal shapes or oval shapes or cross-sectional shapes having grooves can also be used. The expression "ring-like" will also be understood to mean not only circular rings but rather also ring shapes which differ somewhat from a circular ring shape, such as for example a polygon. The sidewall 41 of the recess 14 can also take the form of a polygon or multi-sided figure. Further, although the self-attaching fastener element and method of installation of this invention has particular advantages as a pilotless annular fastening element, it will be understood that these advantages may also be incorporated in a self-attaching element having a central pilot including pierce nuts having parallel re-entrant grooves. Various variants of the invention can be conceived of which some will be explained in more detail with reference to the further FIGS. 9 to 12.

Figure 9:
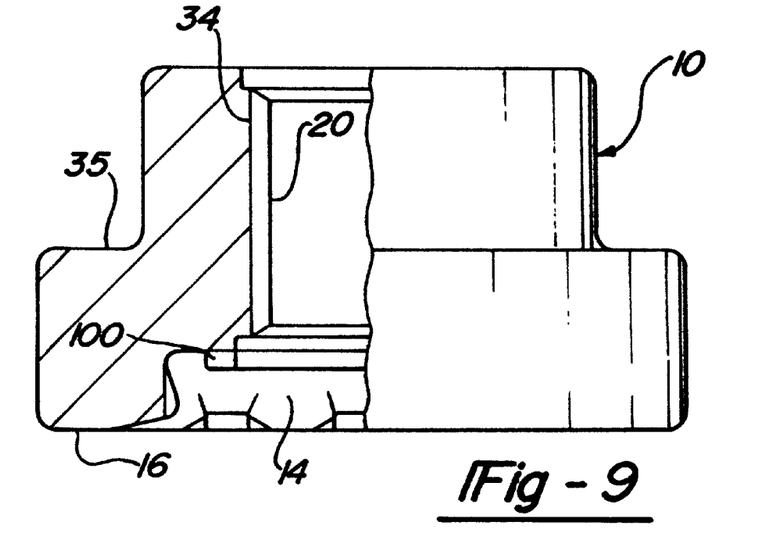
FIG. 9 is a somewhat modified embodiment of the hollow element of FIG. 1 in an illustration corresponding to that of FIG. 2.

In the embodiment of FIG. 9, a projection 100 is located in the base region of the fastener recess 14. This projection 100 is not to be regarded as a pilot portion since it merely enables the use of a shortened thread or of a reduction in the height of the hollow element but otherwise has no function. It would however be conceivable to provide this projection 100 with noses and/or recesses, with the deformation of the sheet metal part against the noses and/or recesses making it possible to achieve an additional security against rotation. A design of this kind with noses 102 and recesses 104 can be seen in FIG. 12 and here the undercut is not only present through the formation of local recesses such as 38 in FIG. 1 but rather in the form of a sidewall or outer wall of the fastener recess 14 which has been inclined all around its periphery whereby a conical fastener recess 106 of the contact surface is generated. Since in the embodiment of FIG. 12 the recesses 38 which form a security against rotation are missing and the sidewall is an inclined wall, the noses 102, 104 represent the only security against rotation.

Figure 10:
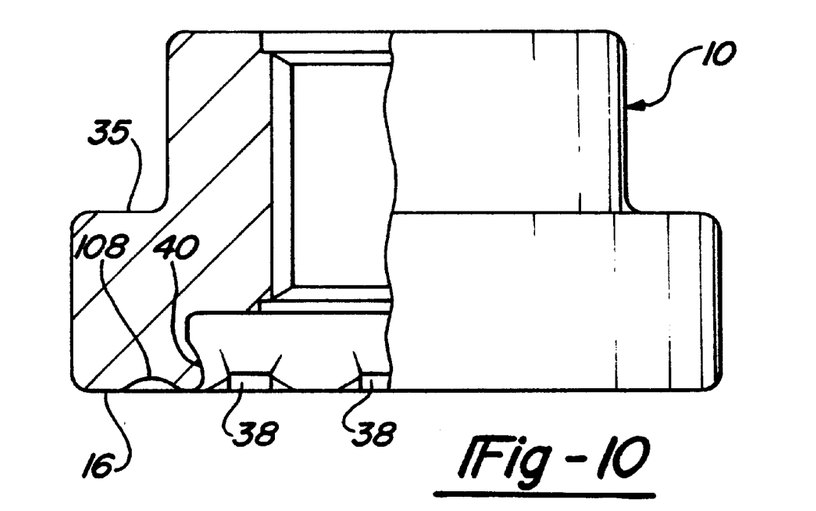
FIG. 10 is a further modification of the hollow element of FIG. 1, likewise in a representation in accordance with FIG. 2.

In the embodiment of FIG. 10, the contact surface 16 is provided with a continuous end face recess 108 which for example has a semicircular cross-section and is depressed at several circumferential locations in order to also form bead-like projections or rib portions 40 here, as in the embodiment of FIG. 1. When using such a profiled contact surface the die button should have a corresponding profile so that the sheet metal lies flush with the whole contact surface. The continuous end face recess 108 can also be so formed in the manner shown in FIG. 11, i.e. as a sinuate corrugated recess in plan view curving toward and away from the fastener recess 14 and wherein the rib portions 40 follow the sinuate contour of the recess or groove 108. When the die button has a form complementary to this as disclosed below, the required security against rotation is ensured by this recess 108. This recess 108 can also be so executed that the inner sidewall of the fastener recess 14 which receives projections 40 which also form undercuts which serve to generate the required push-out resistance and also offer an additional security against rotation.

An advantage of the hollow element of the invention lies in the fact that one hollow element can be used with sheet metal components of various thicknesses, for example metal sheets in the range from 0.75 mm to 2.25 mm. It is only necessary to use a matching die button with the hole-forming punch projection having to have a larger diameter for thinner metal sheets than for thicker metal sheets.

Figure 12:
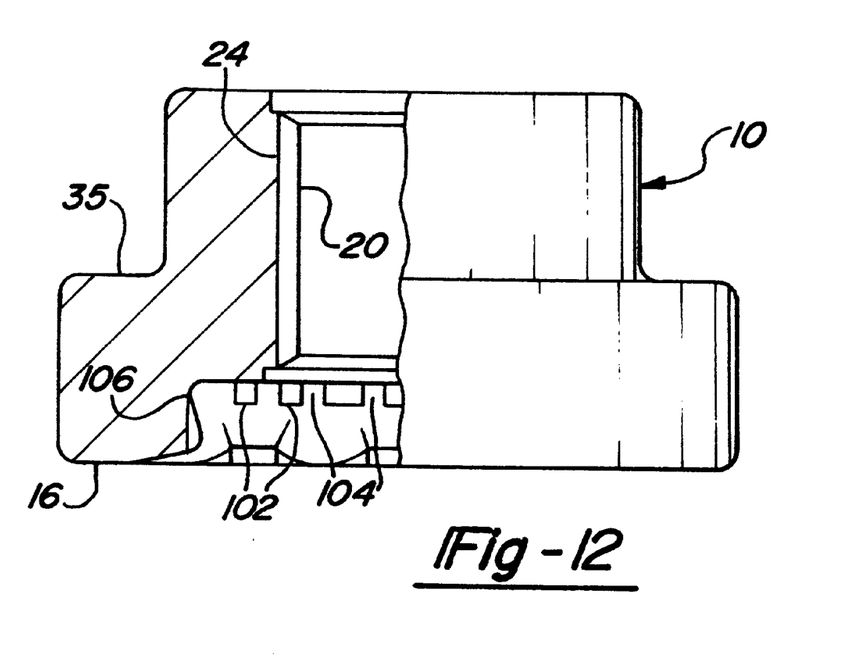
FIG. 12 is a further illustration of a further embodiment of the hollow element of FIG. 1, again in an illustration in accordance with FIG. 2.
Figure 13:
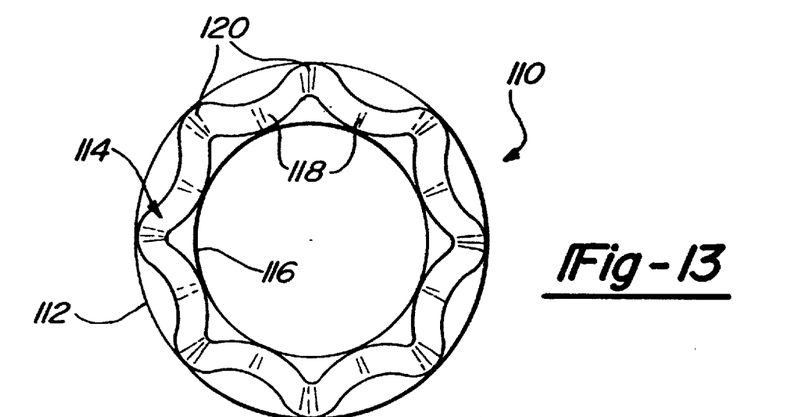
FIG. 13 is a top view of a die member which may be used in the method of this invention to form the self-attaching, female fastener element shown in FIGS. 10 and 11.
Figure 14:
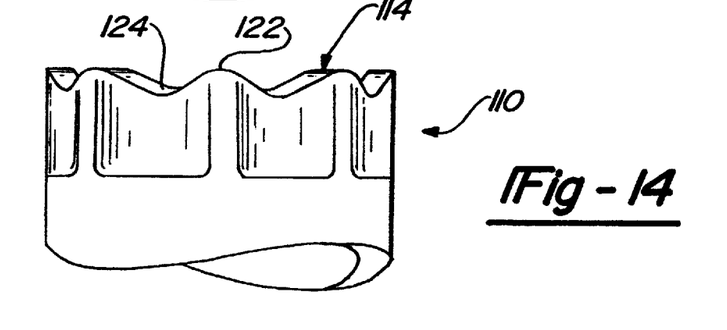
FIG. 14 is a side view of the die member shown in FIG. 13.
Figure 15:
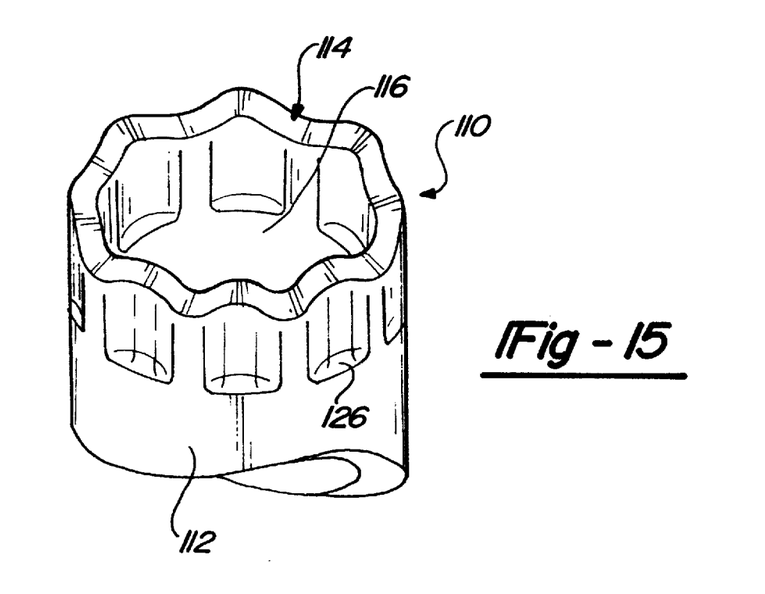
FIG. 15 is an end perspective view of the die member shown in FIGS. 13 and 14.

FIGS. 13 to 15 illustrate one embodiment of a die member 110 suitable for forming the end face recesses 38 and rib portions or bead-like projections 40 of the fastener shown in FIGS. 10 and 12 described above. The die member includes a body portion 112, and annular end face 114 and a central bore 116. The annular end face 114 is sinuate as best shown in FIGS. 13 and 15, including radially inwardly projecting arcuate portions 118 and radially outwardly projecting arcuate portions 120. As best shown in FIG. 14, the annular end face 114 is also sinuate in the side view, including projecting portions 122 separated by recesses 124. The method of forming a self-attaching female fastener element using the die member shown in FIGS. 13 to 15 is described below. It will be understood by those skilled in the art, however, that the projecting portions 122 of the annular end face 114 may be discontinuous, rather than the preferred continuous sinuate form shown in FIGS. 13 to 15.

Figures 16, 17, 18:
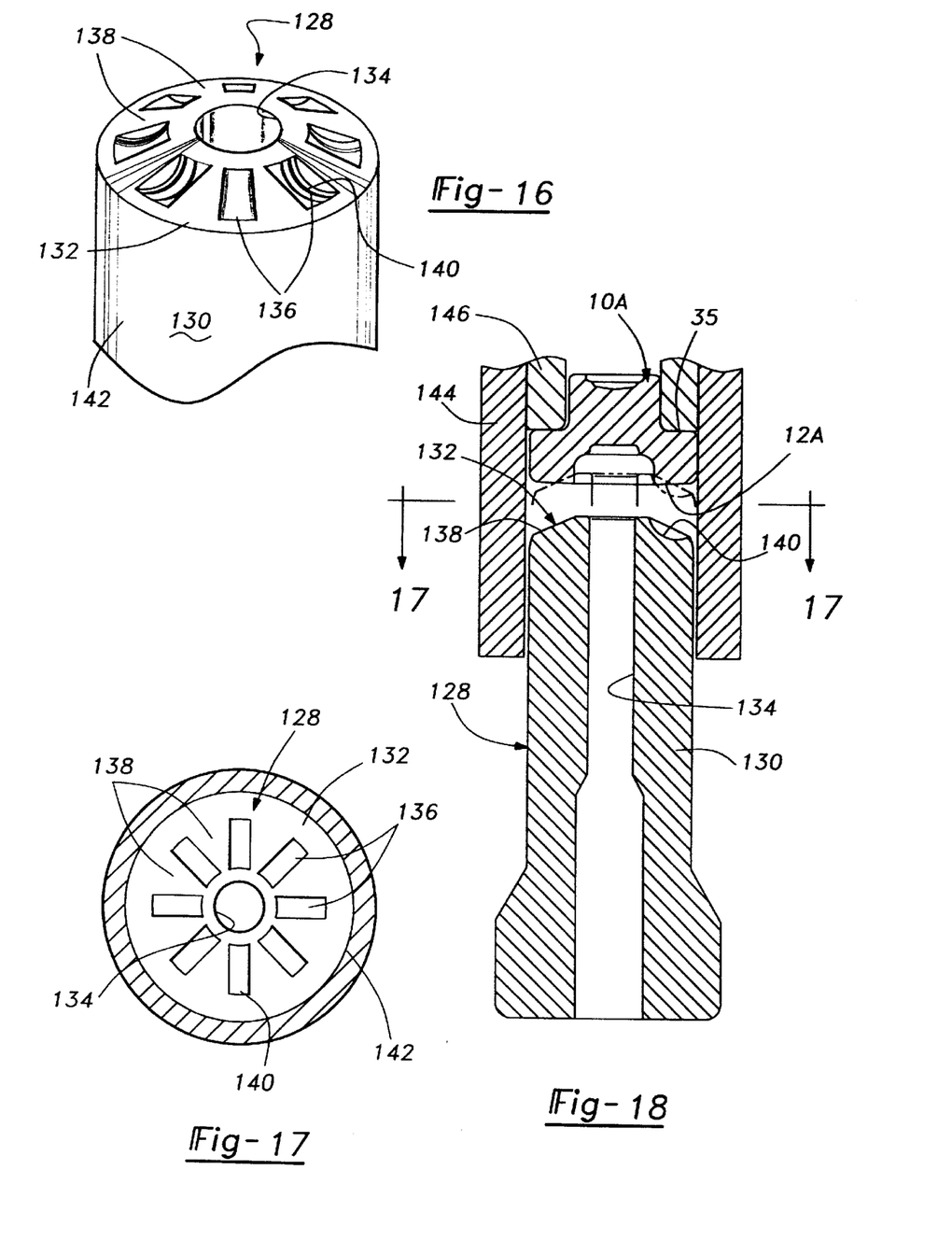
FIG. 16 is an end perspective view of a die member which may be used in the method of this invention to form the self-attaching fastener element shown in FIGS. 1 and 2.
FIG. 17 is an end cross-sectional view of FIG. 18, in the direction of view arrows 17—17.
FIG. 18 is a side cross-sectional view of the die assembly used in the method of this invention to form the self-attaching fastener element shown in FIGS. 1 and 2, and FIGS. 19A–C illustrate various stages in the formation of the self-attaching fastener element shown in FIGS. 1 and 2 illustrating one preferred embodiment of the method of this invention.

The die member 128 shown in FIGS. 16 to 18 is specifically adapted to form the end face 12 of the self-attaching female fastener element 10 shown in FIGS. 1 and 2 as described below. The die member 128 includes a body portion 130 having an annular end face 132 surrounding a central bore 134. In this embodiment, the end face 132 is in the form of a truncated cone which tapers upwardly to the central bore 134. A plurality of spaced radially extending channel-shaped recesses 136 are formed in the annular end face 132 defining projecting radial portions 138 therebetween. In the disclosed embodiment, the recesses include an arcuate bottom wall 140 as shown in FIGS. 16 and 18. The radially extending recesses 136 are spaced from the cylindrical outside surface 142 of the body portion 130 and the axial bore 134.

Figure 19A:
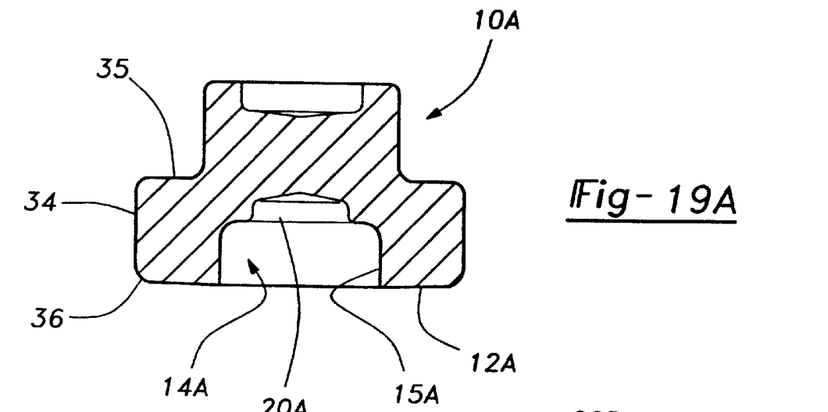

FIG. 19 illustrates the final forming steps of the self-attaching female fastener 10 shown in FIGS. 1 and 2. First, a nut blank is formed generally as shown in FIG. 19A. The nut blank 10A includes a fastener recess 14A surrounding the partial bore 20A formed in the nut blank in prior forming steps, not shown; however, the outer sidewall 15A is generally cylindrical and the panel-supporting end face is planar. The external configuration of the nut blank may be identical to the female fastening element shown in FIGS. 1 and 2 and has been numbered accordingly.

Figure 19B:
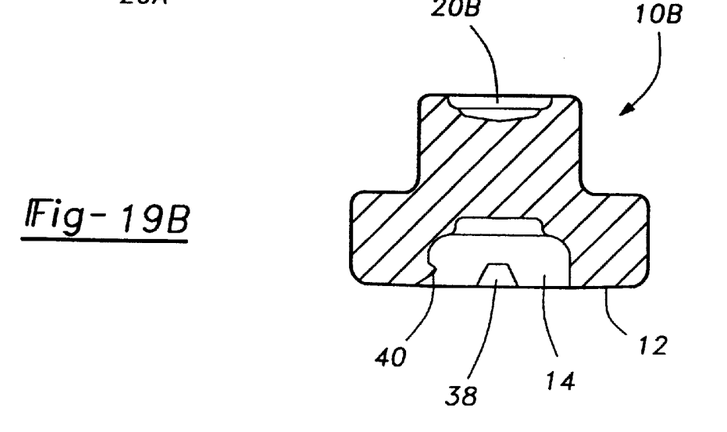
Figure 19C:
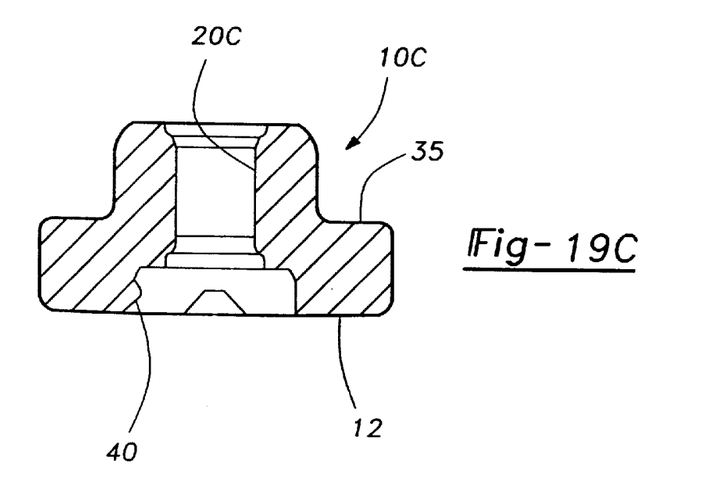

The nut blank 10B is then formed by the die member shown in FIGS. 16 and 17 as now described in regard to FIGS. 18 and 19B. The nut blank 10A is received in a cylindrical nose member 144 beneath a reciprocating plunger which drives the nut against the annular end face 132 of the die member. Alternatively, the die member 128 may be driven against the end surface 12A of the nut blank, as shown in FIG. 18. As the conical annular end face 132 of the die member 128 is driven against the end face 12A of the nut blank 10A as shown in FIG. 18, the projecting portions 138 between the radial die recesses 136 deforms the metal of the nut blank adjacent the opening to the fastener recess forming a wedge shaped end face recesses 38, as shown in FIG. 2, and substantially simultaneously deforms the bead-like projections 40 overlying the bottom wall 18 of the fastener recess 14 as described above in reference to FIGS. 1 and 2. The amount of deformation of the end face 12 of the nut blank is controlled by the bottom wall 140 of the radially recesses in the die member 128. When the bottom walls 140 of the die member recesses engage the end face 12A of the nut blank, the force required for further deformation significantly increases. Thus, the force of the die is easily set to stop further deformation. This results in very accurate forming of the bead-like projections or ribs 40 and the end face recesses 38, such that the inside diameter between the bead like projections 40 is very accurately controlled. This accurate formation of the undercuts 41 (see FIG. 2) is important in the attachment of the self-attaching female fastening element described above. The bore 20 in the nut blank 10C is then completed by driving a punch through the partially formed bore opening 20B as shown in FIG. 19C. The bore may remain unthreaded where a thread-forming stud or male fastener is used or the bore may be threaded by a conventional tapping operation as shown in FIGS. 1 and 2.

Figure 11:
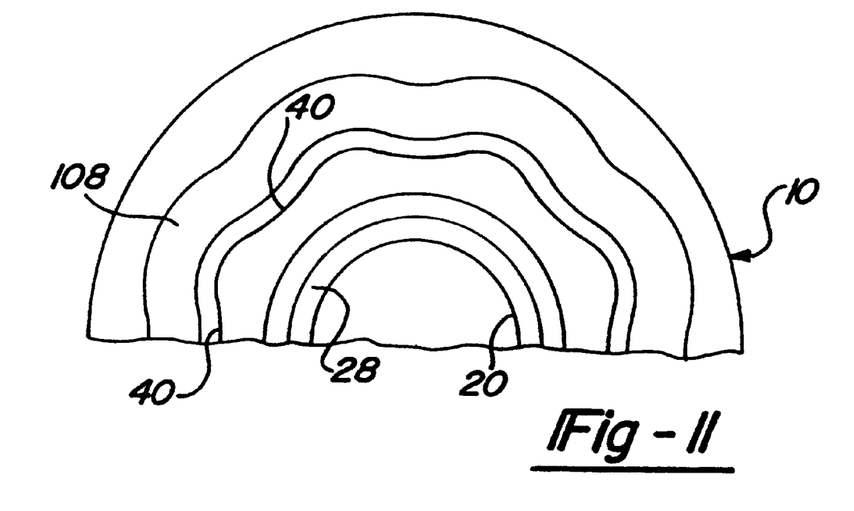
FIG. 11 is a plan view of the contact surface of the hollow element of FIG. 10.

Although the pilotless self-attaching female fastening element 10 of this invention has several advantages over the prior art as described above, the method of forming a fastener element of this invention may also be used to form an undercut having spaced bead-like projections or ribs 40 in many types of fasteners. For example, this method may be used to form a re-entrant groove or a groove having a restricted opening in a fastener of the type disclosed in U.S. Pat. No. 4,971,499 or piloted fasteners of the type discussed above. A fastener of the type shown in FIGS. 10 and 11 may be formed with the die member shown in FIGS. 13 to 15 by the same method disclosed above in regard to FIG. 18. That is, the nut blank 10A is located opposite a die member as shown in FIG. 18, except that the die member will be generally as shown in FIGS. 13 to 15. The projecting portions 122 of the die end face 114 is then driven into the end face 12A forming a continuous recess sinuate 108 in the contact surface 16 of the nut blank 10A, which simultaneously forms the spaced bead-like projections or ribs overlying the bottom wall of the fastener recess as shown in FIGS. 10 and 11. As will be understood by those skilled in the art, various configurations of fastener elements may be formed by this method and this method may be used to form a restricted opening to the recess in any type of self-attaching fastener.

What is claimed is:

1. A method of making a self-attaching female fastening element for attachment to a sheet metal part, said method comprising the following steps:

forming a nut blank having a central axis, a projecting flange portion on at least opposed sides of said central axis having a generally planar end face, and a fastener recess having a bottom wall and an outer wall defined by said flange portion extending generally perpendicular to said fastener recess bottom wall; and deforming said flange portion end face with a die member having an end face including a plurality of spaced projections separated by die recesses, said method including driving said projections of said die member end face into said flange portion end face forming an end face recess in said flange portion end face, and generally simultaneously deforming said fastener recess outer wall inwardly toward said central axis forming a plurality or spaced projecting rib portions projecting from said fastener recess outer wall generally adjacent said flange portion end face overlying said fastener recess bottom wall and defining spaced inclined undercuts at the opening to said fastener recess.

2. The method of making a self-attaching female fastening element as defined in claim 1, wherein said spaced die recesses in said die member end face include a bottom surface, said method including continuing to drive said die member projections into said flange portion end face until said die recesses contact said flange portion end face, thereby limiting deformation of said fastener recess outer wall and accurately forming said projecting rib portions.

3. The method of making a self-attaching female fastening element as defined in claim 1, wherein said die member end face is inclined toward a central axis of said die member, and said spaced die recesses including a generally arcuate bottom wall, said method including continuing to drive said die member projections into said flange portion end face until said arcuate bottom wall surface of said die recesses contact said flange portion end face, thereby limiting deformation of said fastener recess outer wall and accurately forming said projecting rib portions.

4. The method of making a self-attaching female fastening element as defined in claim 1, wherein said method includes forming a bore through said nut blank coincident with said central axis following deformation of said flange portion end face with said die member.

5. The method of making a self-attaching female fastening element as defined in claim 1, wherein said die member end face comprises an annular surface surrounding a central bore, said annular surface including a plurality of radial die recesses spaced from said central bore defining said projections therebetween, said method including driving said die member end face annular surface into said planar flange portion end face, said die member end face projections deforming said flange portion end face forming a plurality of spaced end face recesses in said flange portion end face and deforming said fastener recess outer wall radially inwardly toward said central axis forming said projecting rib portions.

\* \* \* \* \*